March 7, 1933. B. R. BENJAMIN ET AL 1,899,931
TRACTOR PLANTER
Filed Jan. 19, 1931 2 Sheets-Sheet 2
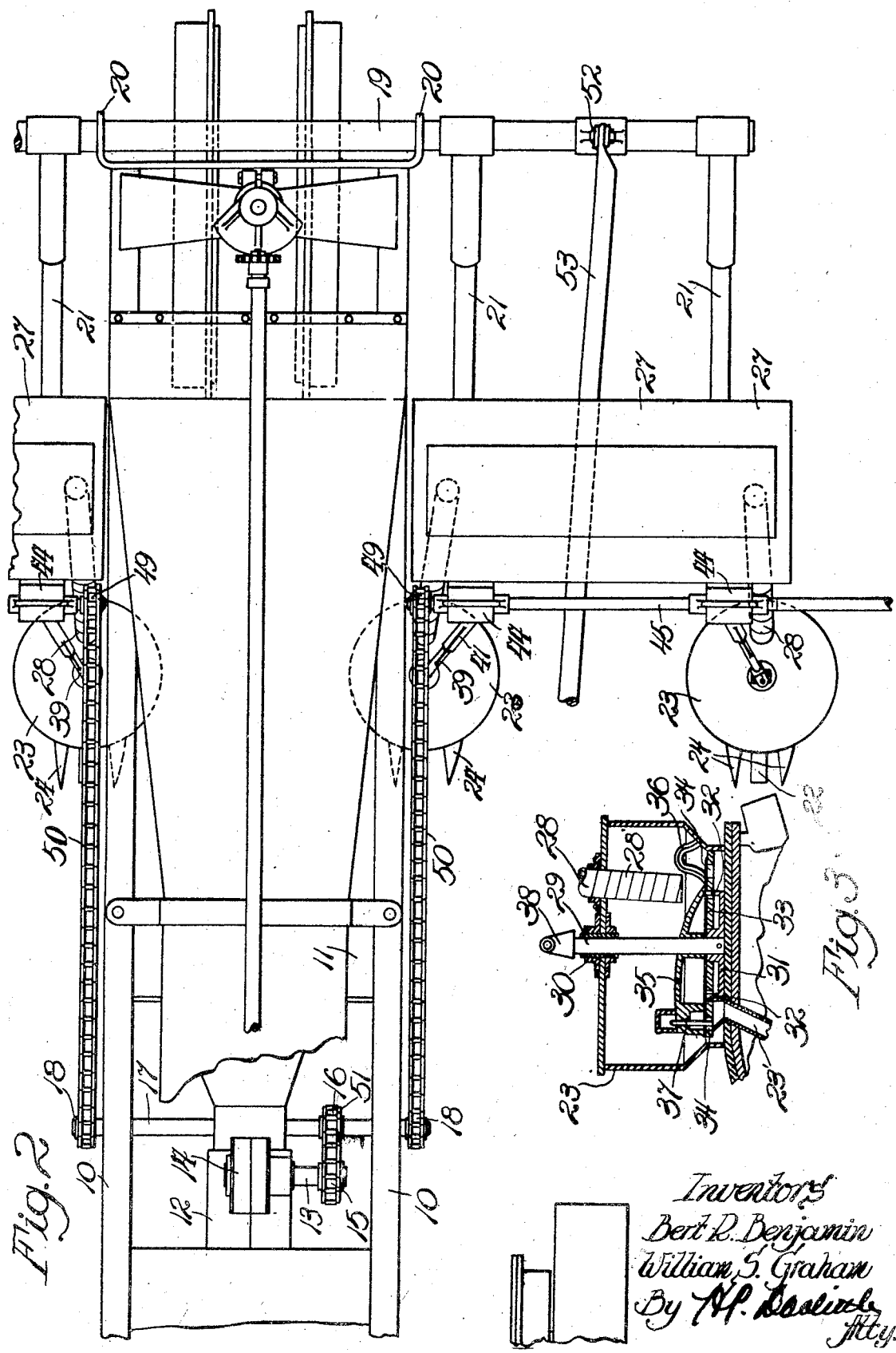
Inventors
Bert R. Benjamin
William S. Graham
By N. P. Doolittle
Atty.

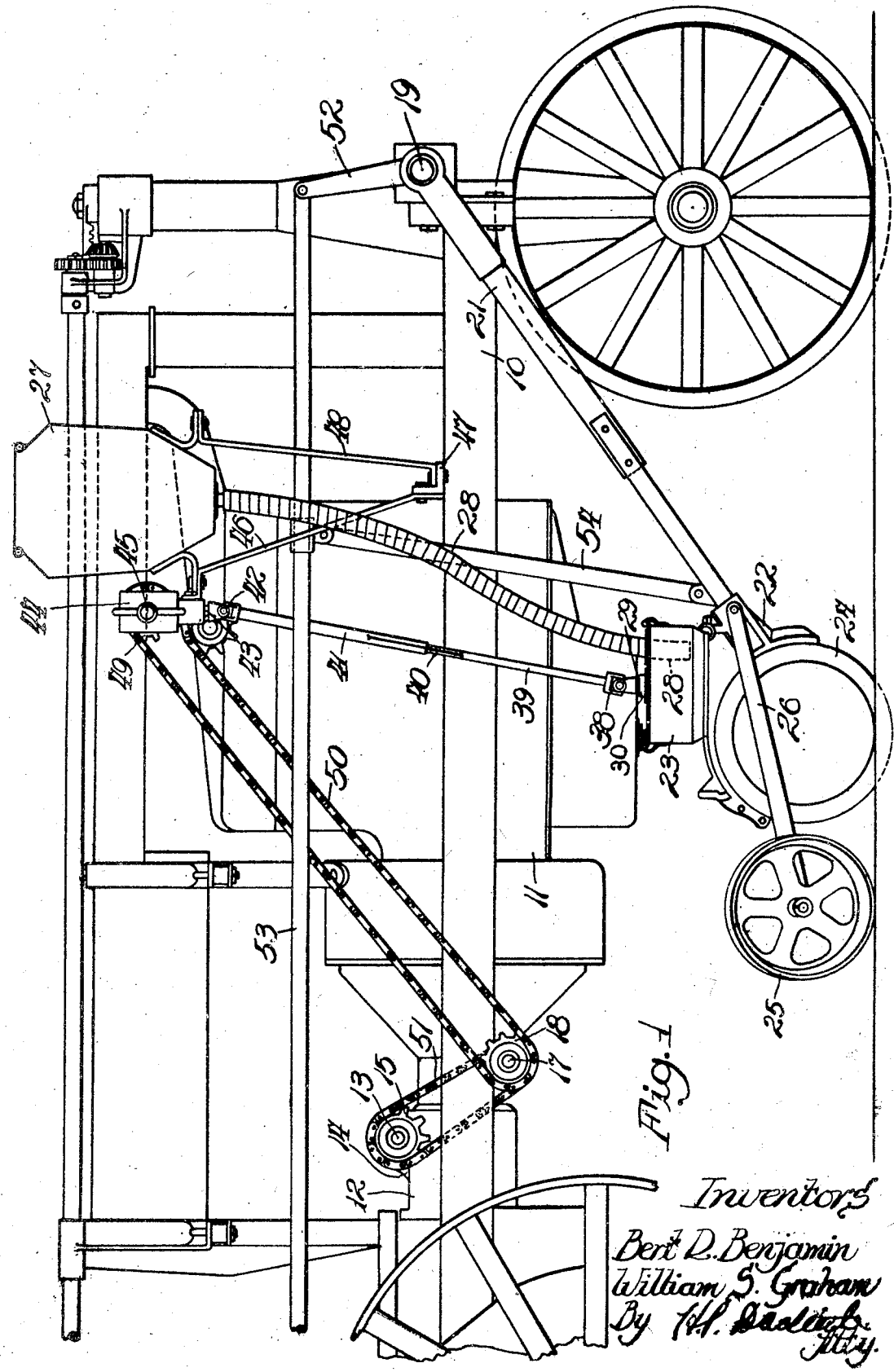

Patented Mar. 7, 1933                                                        1,899,931

UNITED STATES PATENT OFFICE

BERT R. BENJAMIN, OF OAK PARK, AND WILLIAM S. GRAHAM, OF CANTON, ILLINOIS, ASSIGNORS TO INTERNATIONAL HARVESTER COMPANY, A CORPORATION OF NEW JERSEY

TRACTOR PLANTER

Application filed January 19, 1931. Serial No. 509,691.

This invention relates to tractor mounted and operated planters. More specifically, the invention relates to a beet planter, in which the planting units are floatingly attached at the sides of a tractor and are power driven from the tractor engine.

The principal object of this invention is to provide an improved power drive for planter units adapted to be mounted on and operated by a tractor. A particular object is the provision of a novel drive for the seeding mechanisms of the planter units. These and other objects are accomplished by an arrangement of elements, such as illustrated in the drawings.

Figure 1 is a side elevation, showing an embodiment of the invention mounted on a tractor;

Figure 2 is a plan view of such portions of the tractor as are necessary to illustrate the embodiment of the invention; and Figure 3 is an enlarged sectional detailed view of the seed hopper and the driving means therefor.

The tractor shown in the drawings is of a well known type, in which the rear wheels are widely spaced and a dirigible front rolling support is provided. In the provision of seeding devices for mounting on tractors of this type it has been found desirable to drive the mechanism by power obtained from the tractor. It is to an improved means for accomplishing this purpose that the present invention relates.

The tractor illustrated is provided with a frame, side members 10 of which provide means for attaching the elements of this invention. The engine 11 is mounted intermediate of the frame on the side members 10. A drive shaft, not shown, extends rearwardly from the engine through a housing 12. Suitable gearing is provided on said shaft and in the housing for driving a power take-off shaft 13 mounted in and extending from an auxiliary housing 14. A chain sprocket 15 on shaft 13 provides means for driving an aligned chain sprocket 16 on a shaft 17, mounted transversely below the side frame members 10. The shaft 17 is provided with a chain sprocket 18 at each end for driving forwardly mounted shafts arranged to drive the seeding mechanisms, as will be hereinafter described.

At the front of the tractor frame a transverse bar 19 is mounted in brackets 20, rigidly secured to the tractor frame. A plurality of draft beams 21 are pivotally attached to the bar 19 and extend downwardly rearwardly therefrom. Any number of draft beams 21 may be utilized, depending upon the number of rows being planted, said beams being arranged in equally spaced positions on the bar 19. A planter unit is mounted on each of the beams 21. Said planter units are of a conventional construction, consisting essentially of a frame structure 22, on which a seed hopper 23 is mounted, furrow opening means 24, and press wheels 25 attached on supporting members 26, extending rearwardly from the frame structure.

As shown in the enlarged detail of the seed hopper and seeding mechanism in Figure 3, a seed delivery tube 28' extends downwardly for delivering seed to the depositing means. The seed dispensing hopper shown is comparatively small in size and will be designated as the seed supply hopper to distinguish it from the main seed hopper 27 mounted on the tractor, as will be hereinafter described. The hopper 27 is connected by a flexible tube 28 to the seed supply hopper 23. A shaft 29 extends vertically downwardly through a bearing 30 in the top of the hopper 23. The shaft 29 is attached at the bottom of the hopper to a circular member 31, which is provided with upstanding lugs 32, adapted to engage slots provided in the seed plate 33. The seed plate 33 is provided with spaced seed cells 34 around the periphery thereof. Above the seed plate a stationary member 35 is supported on spider members 36 extending to the walls of the hopper. The member 35 carries the usual seed ejecting mechanism 37. The tube 28 has an extension 28' inside the hopper 23 which terminates adjacent the seed plate in spaced relation thereto.

The shaft 29 is connected by a universal joint 38 to a shaft 39. The shaft 39 extends upwardly and is provided with an end portion 40 square in cross section. The end portion 40 slidably fits in a bore of the same cross section in a shaft 41. The shaft 41 is connected by a universal joint 42 to a shaft 43, which extends into a gear housing 44. The gear housing contains bevel gears not shown, one of which is mounted on the shaft 43, the other being mounted on a transverse shaft 45. As best shown in Figure 2, a plurality of the gear housings 44 are provided, each being secured to a supporting bracket 46. These supporting brackets 46 extend downwardly and are secured to an angle bar 47, extending transversely across the frame members 10. A second set of brackets 48 extend upwardly and, together with the brackets 46, provide means for mounting the main seed hoppers 27 at opposite sides of the tractor. The main seed hopper at each side of the tractor provides for all of the seeding units at its side of the tractor. The shafts 45 at their inner ends are provided with chain sprockets 49 in alignment with the sprockets 18 on the shaft 17. Chains 50 provide for driving the sprockets 49 and the shafts 45 on which they are mounted. Chain 51 transmits power from the sprocket 15 to the sprocket 16.

Lifting means, not completely shown, are provided for lifting the planting units out of operative position. Said means may consist in part of lever arms 52 pivotally secured to the bar 19, rearwardly extending beams 53 pivotally attached to the arms 52 and lifting bars 54 attached to the beams 53 and to the frame structures of the planting units.

In the operation of the device power is transmitted through the shaft 13 to the shaft 17 and through the chains 50 to the shafts 45. The shafts 45 rotate the downwardly extending shafts 41 by means of the gearing provided there between. The shafts 39 rotate with the shafts 41 and drive the shafts 29, thereby operating the seeding mechanisms within the hoppers 23. It will be understood that the planting units are floatingly mounted with respect to the tractor frame. This construction requires provision for relative movement of the planter units with respect to the tractor frame. Said movement is amply provided for by the universal joints 38 and 42 and the splined arrangement of the shafts 39 and 41. The flexible tubes 28 provide for a continuous supply from the main hoppers 27 of a comparatively large capacity to the seed supply hoppers 23 which are of a size just sufficiently large to provide for the proper distribution of the seed delivered thereto. The extension 28' of the seed delivery tube functions to deliver seed to a small area of the seed plate whereby with rotation of the plate the seed is continually removed and discharged. The construction insures the discharge of the seed as it comes from the main hopper and prevents accumulation of seeds of different weights or sizes.

It will be understood that applicants have shown and described only a preferred form of their improved planter drive and that they claim as their invention all modifications falling within the scope of the appended claims.

What is claimed is:

1. A tractor mounted and operated planter comprising, in combination with a tractor, a seed supply hopper mounted on said tractor, a soil engaging planter unit floatingly attached thereto, a seed hopper and a seeding mechanism mounted on the planter, driving means on the tractor above the planter unit, means for delivering seed from the supply hopper to the hopper on the planter, and means for operating the seeding mechanism from the driving means, said means including flexible connections to provide for movement of the planter unit relative to the tractor.

2. A tractor mounted and operated planter comprising, in combination with a tractor, a seed supply hopper mounted on the tractor, a soil engaging planter unit floatingly attached to the tractor, a seed hopper and a seeding mechanism on the planter unit, means for delivering seed from the supply hopper to said hopper, means for driving said mechanism including an upwardly extending driving shaft, and means mounted on the tractor and driven from the tractor engine for operating said shaft.

3. A tractor mounted and operated planter comprising, in combination with a tractor, a soil engaging unit floatingly attached to the tractor, a seed hopper mounted on the planter unit, seeding mechanism mounted beneath the hopper, a shaft extending upwardly through the hopper for driving said mechanism, and means mounted on the tractor driven from the tractor engine for operating said shaft.

4. A device as set forth in claim 3, in which the means for operating the seeding mechanism shaft includes a second shaft rotatably mounted on the tractor and a third shaft connected to said shafts by universal joints.

5. A device as set forth in claim 3, in which the means for operating the seeding mechanism shaft includes a shaft rotatably mounted on the tractor and a flexible driving connection between the two shafts.

6. A tractor mounted and operated planter comprising, in combination with the tractor, a planter unit floatingly attached to the tractor, seeding mechanism mounted on the planter unit, a seed hopper mounted above said seeding mechanism, a shaft for driving the seeding mechanism extending upwardly through the hopper, means mounted on the tractor operative to drive said shaft, a seed supply hopper mounted on the tractor, and a flexible seed supply tube leading from said supply hopper to the seed hopper on the planter unit.

7. In a tractor mounted and operated planter unit the combination of a frame structure, a seeding mechanism mounted thereon, a seed hopper mounted above the seeding mechanism, driving means for the seeding mechanism including a shaft operatively connected to the seeding mechanism and extending upwardly through the hopper.

8. In a tractor mounted and operated planter unit the combination of a frame structure adapted to be floatingly attached to the tractor, a seeding mechanism mounted thereon, a seed hopper mounted above the seeding mechanism, driving means for the seeding mechanism including a shaft operatively connected to the seeding mechanism and extending upwardly through the hopper and flexible driving connections for operating said shaft from the tractor.

9. In a tractor mounted planter unit the combination of a seed supply hopper mounted on the tractor above the planter unit, a seed hopper mounted on the planter unit, and seed dispensing mechanism, including a seed plate rotatable in the bottom of the hopper and a seed delivery tube extending from the upper hopper to the lower hopper and terminating adjacent the seed plate.

10. In a tractor mounted planter unit the combination of a seed supply hopper mounted on the tractor above the planter unit, a seed hopper mounted on the planter unit, seed dispensing mechanism, including a seed plate rotatable in the bottom of the hopper, and seed delivery means extending from the upper hopper to the lower hopper, said means including means for delivering the seed to a comparatively small area of the seed plate.

11. A tractor mounted planter comprising, in combination with a tractor, a seed supply hopper mounted thereon, a soil engaging planter unit pivotally attached to the tractor, a seed hopper and an associated seeding mechanism mounted on the planter, means for driving said mechanism, and means for delivering seed from the supply hopper to the hopper on the planter, said means including flexible connections to provide for movement of the planter unit relative to the tractor.

In testimony whereof we affix our signatures.

BERT R. BENJAMIN.
WILLIAM S. GRAHAM.